United States Patent
Xu (10) Patent No.: US 12,423,072 B2
(45) Date of Patent: Sep. 23, 2025

(54) SYSTEMS AND METHODS FOR VALIDATING STRUCTURED DOCUMENTS

(71) Applicant: SAP SE, Walldorf (DE)

(72) Inventor: Chang Xu, Beijing (CN)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 18/316,718

(22) Filed: May 12, 2023

(65) Prior Publication Data

US 2024/0311430 A1 Sep. 19, 2024

Related U.S. Application Data

(63) Continuation of application No. PCT/CN2023/081630, filed on Mar. 15, 2023.

(51) Int. Cl.
*G06F 8/41* (2018.01)
*G06F 8/75* (2018.01)

(52) U.S. Cl.
CPC . *G06F 8/43* (2013.01); *G06F 8/75* (2013.01)

(58) Field of Classification Search
CPC .................... G06F 8/43; G06F 8/75
USPC .................. 707/694; 717/120–126
See application file for complete search history.

(56) References Cited

U.S. PATENT DOCUMENTS

| | | | |
|---|---|---|---|
| 7,865,822 B2* | 1/2011 | Yu | G06F 40/226 |
| | | | 715/255 |
| 10,242,219 B2* | 3/2019 | Struttmann | H04L 9/3239 |
| 10,614,345 B1* | 4/2020 | Tecuci | G06N 3/08 |
| 11,568,423 B2* | 1/2023 | Miller | G06Q 50/18 |
| 2017/0235835 A1* | 8/2017 | Wang | H04L 51/52 |
| | | | 707/706 |

OTHER PUBLICATIONS

Wallace Jackson, "Chapter 3—The JSON Schema: JSON Structure Validation", 2016, in Book: JSON Quick Syntax Reference, Apress, pp. 21-29. (Year: 2016).*
Wright et al., "JSON Schema Validation: A Vocabulary for Structural Validation of JSON", 2022, 28 pages. (Year: 2022).*

* cited by examiner

*Primary Examiner* — Ted T. Vo
(74) *Attorney, Agent, or Firm* — Fountainhead Law Group, PC (57) ABSTRACT

Embodiments of the present disclosure include techniques for validating structured electronic documents. In one embodiment, a structured electronic document comprises a reference to a fragment in another structure electronic document. The documents are combined to replace reference with the fragment. The resulting combined document may be validated to generate a first diagnostic array corresponding to the combined document. The first diagnostic array is converted to a second diagnostic array corresponding to the original document. A validation result may specify where in the original documents an error occurred.

20 Claims, 7 Drawing Sheets

```
{
    "$schema": "http://json-schema.org/draft-07/schema#",
    "properties": {
        "Sections": {
            "items": {
                "properties": {
                    "Name": {
                        "type": "string"
                    },
                    "Available": {
                        "type": "boolean"
                    }
                }
            },
            "type": "array"
        }
    },
    "type": "object"
}
```

```
{
    "Sections": {
        "_Type": "Fragment",
        "Fragment": "other.fragment",
        "Properties": {
            "#Index:0": {
                "Available": 100
            }
        }
    }
}
```

```
[
    {
        "Name": "Name1",
        "Available": true
    },
    {
        "Name": "Name2",
        "Available": true
    },
    {
        "Name": "Name3",
        "Available": false
    }
]
```

```
1  {
2      "Sections": [
3          {
4              "Name": "Name1",
5              "Available": true
6          },
7          {
8              "Name": "Name2",
9              "Available": true
10         },
11         {
12             "Name": "Name3",
13             "Available": false
14         }
15     ]
16 }
```

*Fig. 3D*

```
 1  {                                                   305
 2      "Sections": [
 3          {
 4              "Name": "Name1",
 5              "Available": 100
 6          },
 7          {
 8              "Name": "Name2",
 9              "Available": true
10          },
11          {
12              "Name": "Name3",
13              "Available": false
14          }
15      ]
16  }
```

*Fig. 3E*

```
{                                              306
    "message": "Incorrect type. Expected \"boolean\".",
    "range": {
        "start": { "line": 4, "character": 16},
        "end": { "line": 4, "character": 19}
    },
    "severity": 1
}
```

*Fig. 3F*

```
{                                              307
    "message": "Incorrect type. Expected \"boolean\".",
    "range": {
        "start": { "line": 6, "character": 16},
        "end": { "line": 6, "character": 19}
    },
    "severity": 1
}
```

SYSTEMS AND METHODS FOR VALIDATING STRUCTURED DOCUMENTS

CROSS REFERENCE TO RELATED APPLICATIONS

This application is a continuation of, and claims priority to, International Application Number PCT/CN2023/081630 filed on Mar. 15, 2023 under the Patent Cooperation Treaty (PCT), the entire contents of which are hereby incorporated herein by reference.

BACKGROUND

The present disclosure relates generally to software systems, and in particular, to systems and methods for validating structured electronic documents.

Computers require source code (software) to operate. Modern source code is often embodied as a document (e.g., a source code document) with customized logic for the computer to execute to perform a task. Source code documents are typically written by a programmer in an editor software system with source code validation capabilities that may automatically detect errors in the code and provide messages to a programmer when a coding error occurs. One example editor is Visual Studio Code, also commonly referred to as VS Code, which is a source-code editor made by Microsoft®. Features of VS Code include support for debugging, syntax highlighting, intelligent code completion, snippets, code refactoring, and the like, for example. VS Code provides an API that enable developers to indicate the issues in source code documents with the customized logic. With this functionality, VS Code can report diagnostic errors for any open editors or resources in the open folder at any position.

However, error diagnostic features have limitations. When interacting code is spread out across multiple source code documents, diagnosing errors in the code can be impaired.

The present disclose is directed to techniques for improving validation of structured electronic documents, which may comprise interacting source code distributed across multiple documents, for example.

DETAILED DESCRIPTION

Described herein are techniques for validating structured electronic documents. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
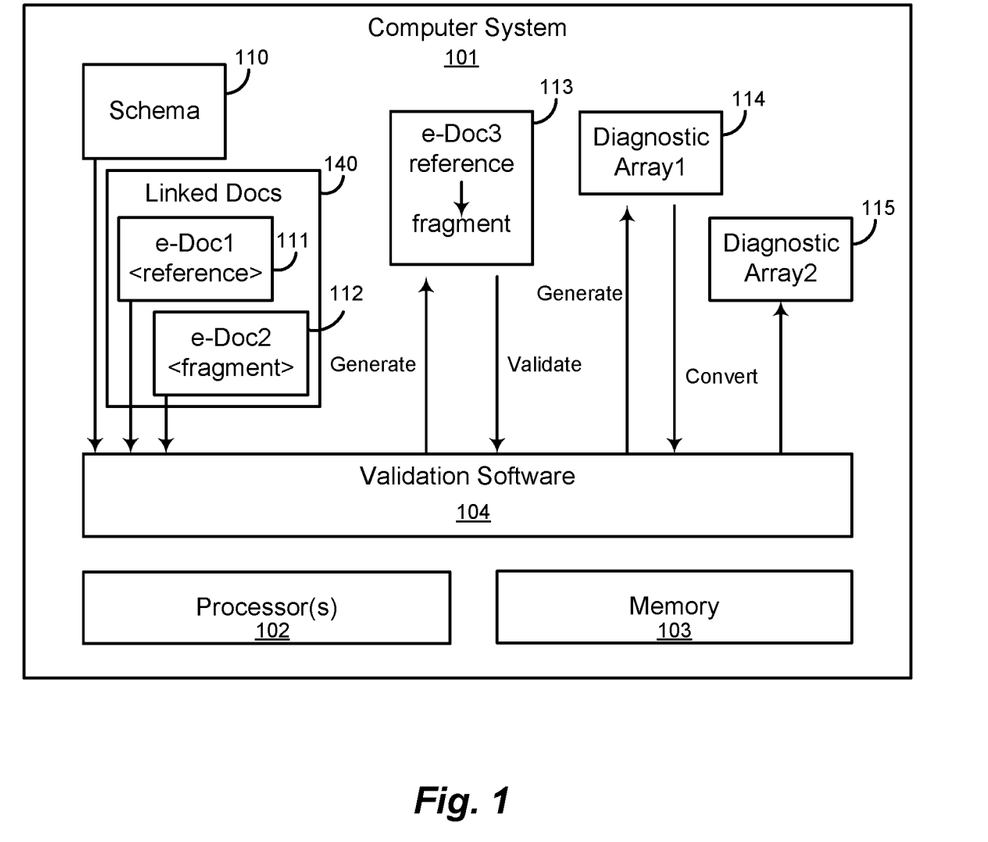
FIG. 1 illustrates a system for validating structured electronic documents according to an embodiment.

FIG. 1 illustrates a system for validating structured electronic documents according to an embodiment. Embodiments of the present disclosure comprise software for validating structured electronic documents. The software may comprise instructions executable by a computer system 101. Instructions are stored on one or more computer readable medium, such as a memory 103. The instructions, when executed by at least one processor 102, perform a method of validating structured electronic documents. Structure of an electronic document may be specified by a schema file 110. A schema, in programming, specifies an organization or structure of an entity (e.g., a document, a database, or other programming entities). A schema may define the structure and/or data formats used by a plurality of linked electronic documents 140, including electronic documents 110 and 112, for example. Embodiments of the present disclosure advantageously process schema 110 and electronic document ("e-Doc1") 111 and electronic document ("e-Doc2") 112 (and in some cases additional like documents) using validation software 104 to validate the linked electronic documents. Here, one of the linked documents 140, e.g., electronic document 112, comprises a document fragment, and another one of the linked electronic documents, e.g., electronic document 111, comprises a reference to the document fragment. In some cases, additional documents may be linked by references to fragments, for example. Validation software 104 may parse schema file 110 to determine a structure and/or data format for the documents being validated. Next, validation software 104 parses electronic document 111 to identify a reference ("<reference>") to a document fragment (<fragment>) in electronic document 112. Validation software 104 generates a new structured electronic document ("e-Doc3") 113 comprising the electronic document 111 with the document fragment from electronic document 112 inserted in place of the reference. Validation software then validates electronic document 113. In some embodiments, documents 111 and 112 are source code and the document fragment is a source code fragment, for example, although the techniques described herein are more generally applicable.

Features and advantages of the present disclosure further include generating validation results, which may specify locations of errors in the electronic documents, for example. For example, validation software 104 may analyze combined document 113 for errors and generate a diagnostic array 114. Diagnostic array 114 may be generated based on a mismatch between the combined electronic document 113 and the structure or data formats specified in schema 110. A diagnostic array 114 may be a two-dimensional array where rows correspond to rows of text and columns correspond to positions of characters in each row. Locations of errors in document 113 may be specified by ranges, such as a row and range of column values or a range between multiple rows and column values, for example. However, since diagnostic array 114 is generated based on combined document 113, and not the original linked documents 111 and 112, diagnostic array 114 specifies errors in document 113 and not documents 111 and 112. Accordingly, a user may not be able to assess an error in documents 111 and 112 based on diagnostic array 114 alone. Advantageously, embodiments of the present disclosure may further include converting the diagnostic array 114 to another diagnostic array 115 matching the first structured electronic document. Diagnostic array 115 may also be a two dimensional array corresponding to rows and columns of text. However, the values are mapped from array 114 to array 115 so that diagnostic array 115 shows errors in the context of the original linked documents 111 and 112. Accordingly, errors may be presented to a user in the context of the original linked documents, for example, and the user may take the appropriate remedial steps to correct the documents.

Figure 2:
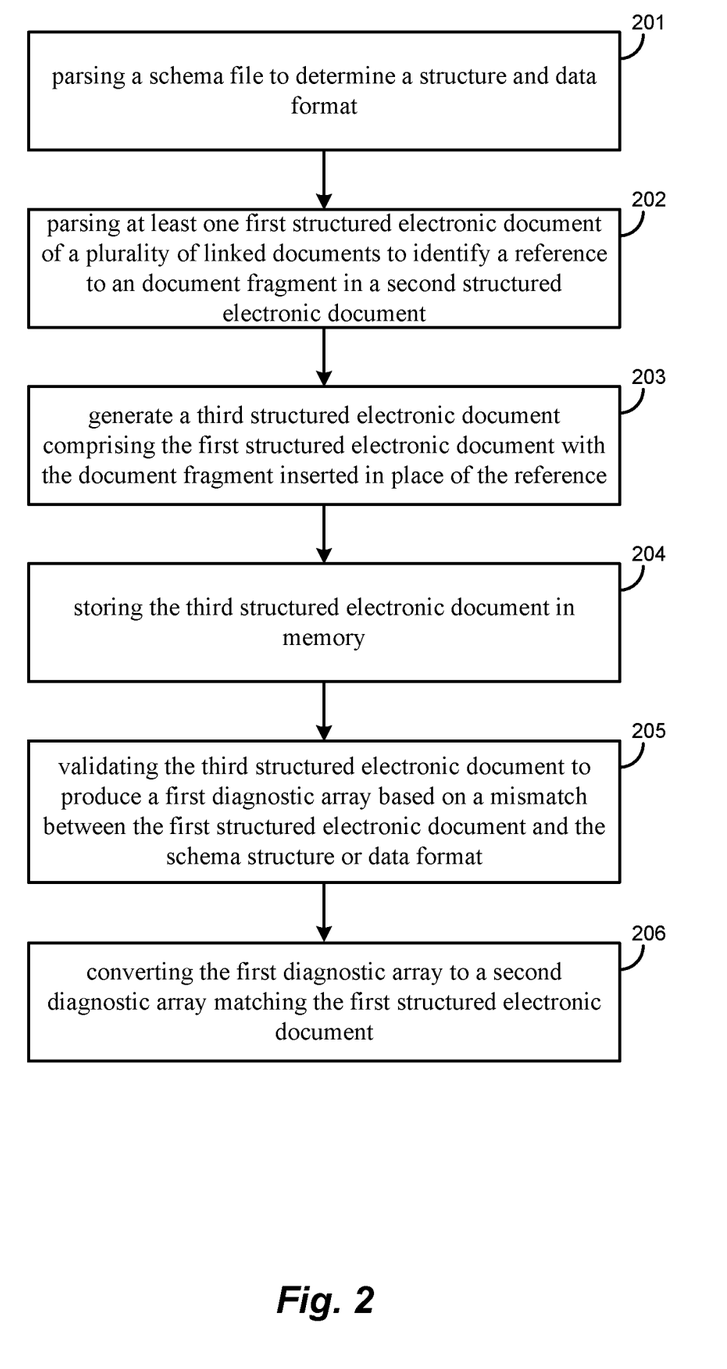
FIG. 2 illustrates a method for validating structured electronic documents according to an embodiment.

FIG. 2 illustrates a method for validating structured electronic documents according to an embodiment. At 201, a schema file is parsed (i.e., analyzed by validation software) to determine a structure and data format. At 202, at least one first structured electronic document of a plurality of linked structured electronic documents is parsed to identify a reference to a document fragment in a second structured electronic document. At 203, a third structured electronic document is generated comprising the document fragment inserted in place of the reference. For example, in one embodiment, validation software may parse override property values in the first structured electronic document and replace corresponding property values from the document fragment in the second structured electronic document with the override property values to produce the third combined electronic document. At 204, the third structured electronic document may be stored in memory, for example. At 205, the third structured electronic document is validated to produce a first diagnostic array. Validation may be based on a mismatch between the generated third structured electronic document and the schema structure or data format, for example. In some embodiments, the first diagnostic array specifies a location of an error in the third structured electronic document. Accordingly, at 206, the first diagnostic array is converted to a second diagnostic array matching the first structured electronic document. The second diagnostic array specifies a location of the error in the first structured electronic document and/or the second structured electronic document. Accordingly, a user may view an error in the context of the original documents and take remedial action.

Figure 3A:
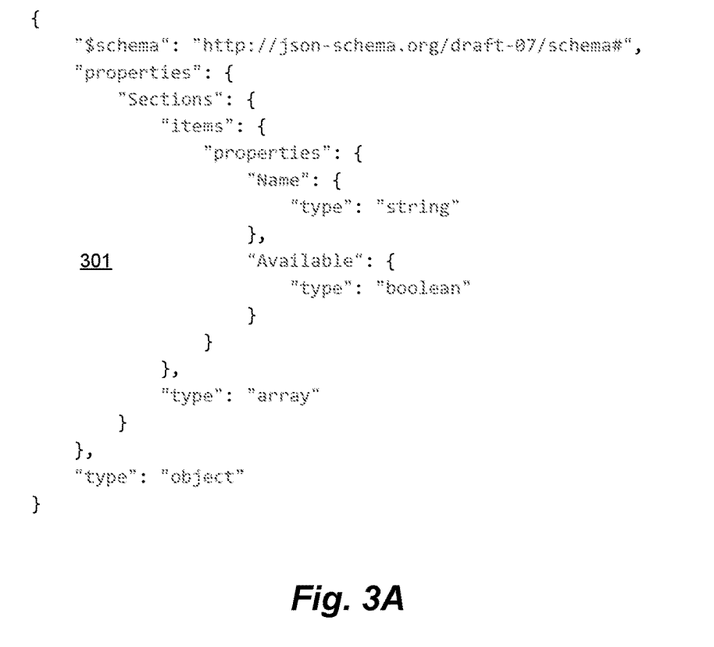
FIG. 3A illustrates an example schema file according to an embodiment.

FIG. 3A illustrates an example schema file according to an embodiment. In this example, the schema 301 is a JavaScript Object Notation (JSON) schema and the first and second structured electronic documents are JSON files comprising source code. For JSON files, JSON schemas may be used to describe the JSON format, structure, value sets, and descriptions, so a JSON schema may be used to validate the JSON files (e.g., using VS Code extension programming). If the JSON structure and data format corresponds with a description in JSON schema, there are no diagnostic errors. Otherwise, the diagnostic errors may be observed, for example, in an open document in VS Code.

Figure 3B:
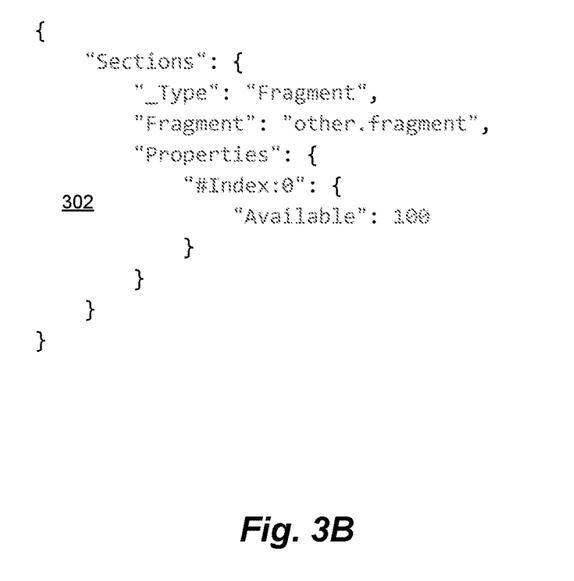
FIG. 3B illustrates an example structured electronic document comprising a reference according to an embodiment.

In the following example, one JSON fragment file is referenced in another JSON file with some override property values. FIG. 3A illustrates an example JSON schema file—Section.schema. FIG. 3B illustrates an example JSON code file—Section.json—including a reference. The reference links to a JSON file illustrated in FIG. 3C—Other.fragment. Accordingly, Section.schema is JSON schema file that specifies the JSON structure and data format for the Section.json file, Section.json is JSON instance that has a JSON fragment file reference with some override properties, and Other.fragment is JSON fragment file is referenced in Section.json file. More specifically, in the "Section.json" file, the code references "Other.fragment" file and override the property "Available" with the new value 100 for the item 1 (keyword is "#Index: 0") of the content. However, the new value 100 is invalid according to the specification in the "Section.schema" file (i.e., "Available" is of type Boolean and 100 is not a Boolean value).

Figure 3C:
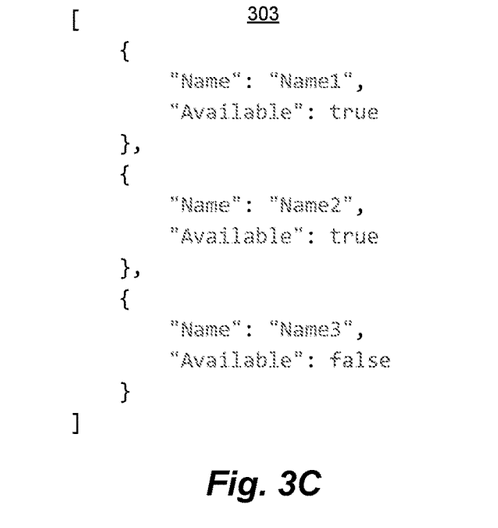
FIG. 3C illustrates an example structured electronic document comprising a document fragment referenced by another document according to an embodiment.
Figure 3D:
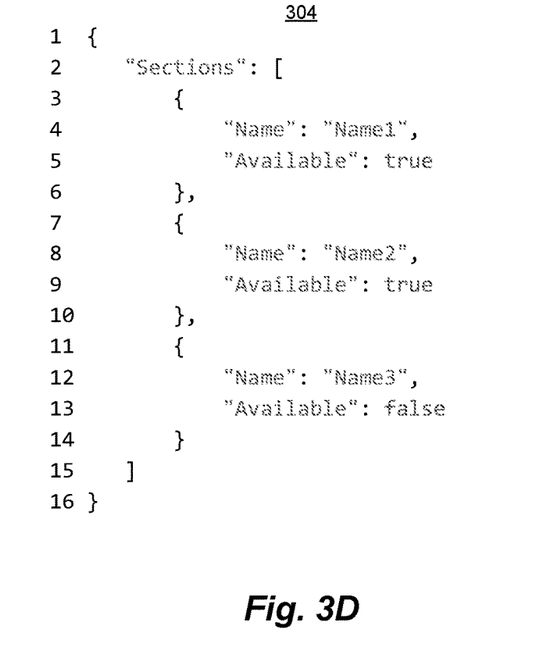
FIG. 3D illustrates an example structured electronic document combining the structured electronic document of FIG. 3B with the document fragment of FIG. 3C inserted in place of the reference according to an embodiment.
Figure 3E:
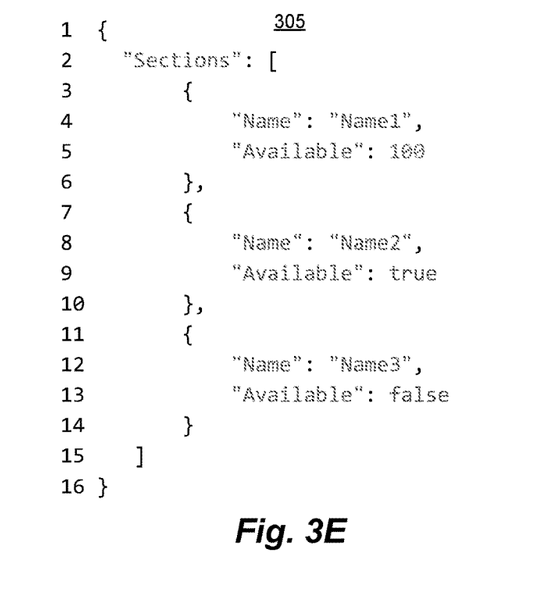
FIG. 3E illustrates an example of replacing property values from a fragment with override property values according to an embodiment.

The present techniques allow validation software to indicate the diagnostic error for this new override property value 100 and may show the message in VS Code, for example. From above, the following illustrative steps may be used to solve this example problem: (i) fill in the Section.json file with the content of the Other.fragment file to replace the "Fragment" property, (ii) parse "Property" item to get the override properties, then replace the fragment file properties with these override property values, (iii) get a new filled and override document in memory, (iv) validate the new document in memory (e.g., by using any suitable 3rd party library known to those skilled in the art) and get the diagnostic array as a result, and (v) convert the diagnostic array in step (iv) to get a new diagnostic array to match with the original JSON file document. Referring to FIGS. 3B and 3C. Section.json with Other.fragment are combined to fill in the Section.json file with the fragment and obtain code 304 shown in FIG. 3D. Next, the override properties are parsed out and the fragment file properties are replaced with the override property values. The result is shown in FIG. 3E, which illustrates an example of replacing property values from a fragment with override property values. Note that the first item of the Section array, the "Available" property, is replaced with 100. This new combined document may be compared against Section.schema to validate the new combined document.

Figure 3F:
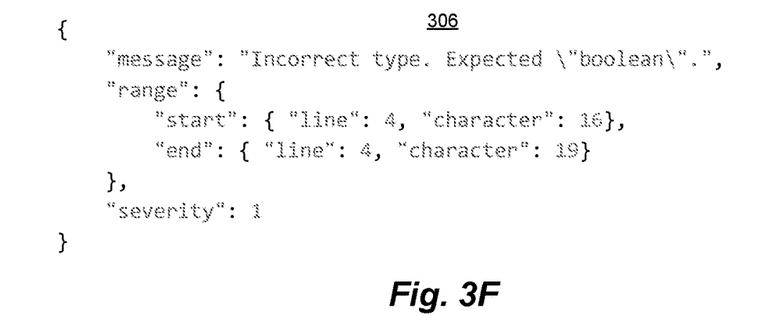
FIG. 3F illustrates a validation result according to an embodiment.
Figure 3G:
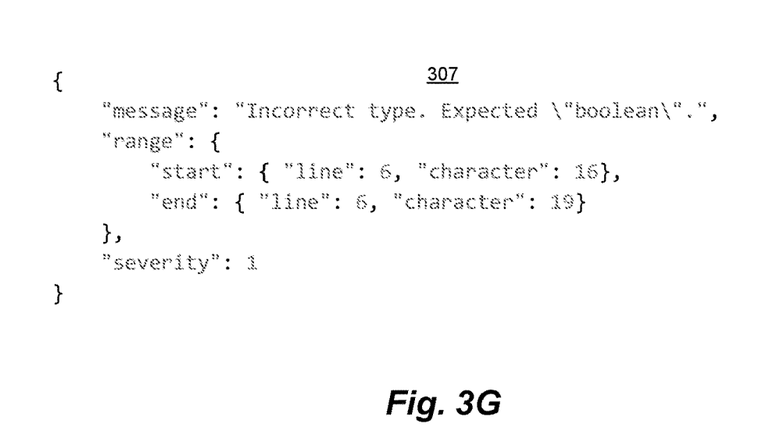
FIG. 3G illustrates a converted validation result according to another embodiment.

FIG. 3F illustrates a validation result according to an embodiment. The validation result (aka, diagnostic result) comprises a "range" section ("start" and "end"), which describes a diagnostics range in the document validated (code 305 in FIG. 3E). Validation result 306 may be generated based on a diagnostic array mentioned above, for example. The "line" means the actual line number in the document, and the "character" means the actual column number in the document. In this example, the numbers are starting from zero. In the diagnostic result in FIG. 3F, the actual validation error position is line 5, at the value 100 (note that the diagnostic result starts the count from 0, but code 305 counts from 1). The validation result in FIG. 3F is based on the document that generated by combining Section.json and Other.json, including the replaced values in FIG. 3E. Therefore, the validation result may be converted to match with the original document in FIG. 3B. For example, this may be achieved by converting the diagnostic array for the combined document into the diagnostic array for the original document as described above. FIG. 3G illustrates a converted validation result 307. As illustrated in FIG. 3G, the range refers to row 6 (starting from 0), characters 16-19, which is the value of "100" in code 302 in FIG. 3B at line 7 (starting from 1).

Figure 4:
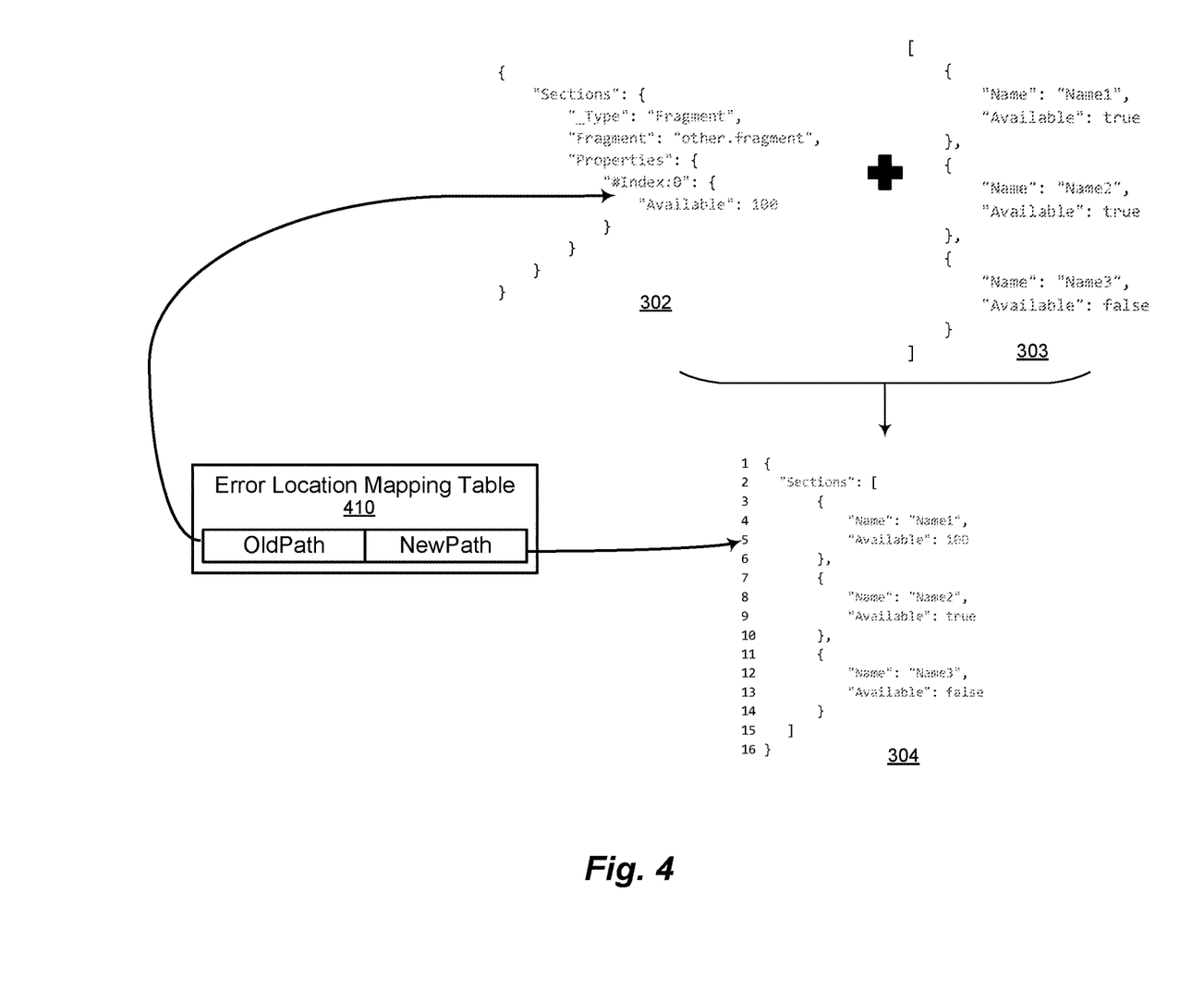
FIG. 4 illustrates an error location mapping table according to an embodiment.

FIG. 4 illustrates an error location mapping table 410 according to an embodiment. In some embodiments, the location of an error in a combined structured electronic document and the location of the error in the original structured electronic document may be stored in an error location mapping table. The error location mapping table may then be used to translate validation results for the combined document to validation results for the original document. From the above example in FIGS. 3A-G, code 302 is combined with code 303 to produce code 304, which is validated. During the fragment insertion described above (e.g., filling step (i) and parsing step (ii)), a value specifying the location of the reference may be added into error location mapping table 410. In this example, the relationship between the original document and the combined document may be implemented with the new path (e.g., the location of the error in the combined document) as a "key" and the old path (e.g., the location of the reference in the original document) as the "value"—e.g., Key (new jsonPath)="Sections |0| Available" and Value (old jsonPath)=["Sections", "Properties", "#index:0", "Available"]. The "key" may be a string with a separator (here is "|"), which indicates the override property position in the new document (e.g., generated in memory). Value is the actual jsonPath to the reference in the original document. The diagnostic result may then be converted using error location mapping table 410 to match the diagnostic array values for the combined document (code 304) with diagnostic array values for the original document (code 302). The final diagnostic result for the original document may then be generated from the new diagnostic array values, for example.

Figure 5:
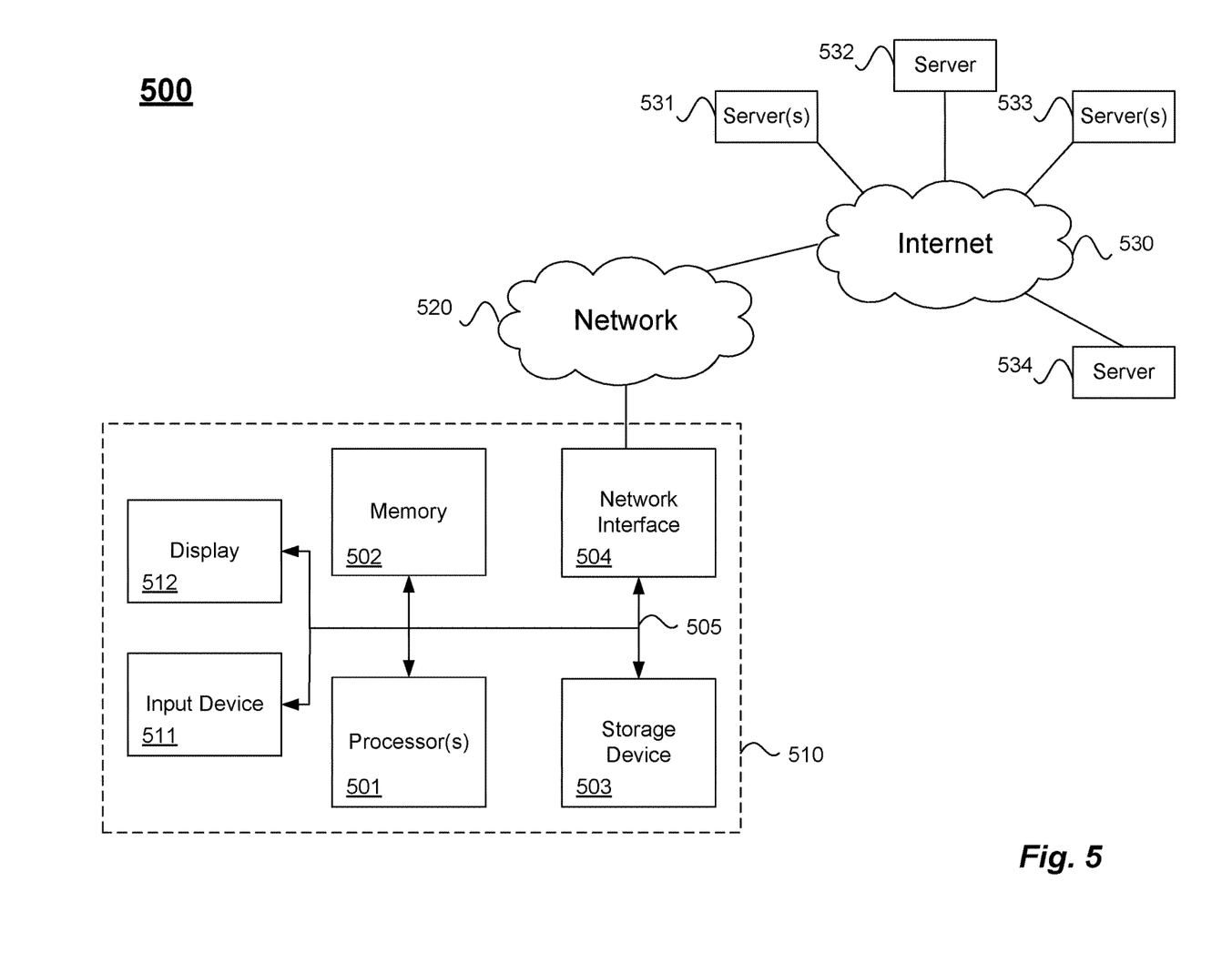
FIG. 5 is an example computer hardware system with an improved document validation system according to an embodiment.

FIG. 5 illustrates hardware of a special purpose computing machine configured according to the above disclosure. The following hardware description is merely one example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

Computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a front end (e.g., a browser), for example, may access data and features on backend software systems that may reside on multiple different hardware servers on-prem 531 or across the Internet 530 on servers 532-535. One or more of servers 532-535 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a processor or method.

Embodiments of the present disclosure include techniques for validating structured electronic documents.

In various embodiments, the present disclosure includes a method, a system comprising at least one processor and computer readable medium, or one or more non-transitory computer readable medium storing computer-executable instructions that, when executed by at least one processor, perform a method of validating structured electronic documents. The method of validating structured electronic documents comprising: parsing a schema file to determine a structure and data formats; parsing at least one first structured electronic document of a plurality of linked structured electronic documents to identify at least one reference to a document fragment in a second structured electronic document of the plurality of linked documents; generate a third structured electronic document comprising the first structured electronic document with the document fragment inserted in place of the reference; validating the third structured electronic document to produce a first diagnostic array based on a mismatch between the third structured electronic document and structure or data formats specified in the schema file; and converting the first diagnostic array to a second diagnostic array matching the at least one first structured electronic document.

In one embodiment, the first electronic document comprises source code and the document fragment is a source code fragment.

In one embodiment, inserting the document fragment in the place of the reference comprises: parsing one or more override property values in the first structured electronic document; and replacing one or more corresponding property values from the document fragment with the override property values in the first structured electronic document.

In one embodiment, the schema file is a JavaScript Object Notation schema and the first and second structured electronic documents are JavaScript Object Notation files comprising source code.

In one embodiment, the method further comprising: determining locations of one or more errors in the third structured electronic document; and mapping the locations of the one or more errors in the third structured electronic document to corresponding locations of the errors in one or more of the plurality of linked structured electronic documents.

In one embodiment, the method further comprising storing a location of an error in the third structured electronic document and a location of the error in the first structured electronic document in an error location mapping table.

In one embodiment, the location of the error in the third structured electronic document and the location of the error in the first structured electronic document form a key/value pair to convert the first diagnostic array to a second diagnostic array. In one embodiment, the value specifying the location of the error in the first structured document is stored, during identification of the reference to the document fragment, as the location of the reference, and the key specifying the location of the error in the third structured electronic document is stored, after the first diagnostic array is produced, as the location of the error in the first structured electronic document.

In one embodiment, the first diagnostic array specifies a location of an error in the third structured electronic document and the second diagnostic array specifies a location of the error in the first structured electronic document.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method of validating structured electronic documents comprising:
   parsing, by at least one computer, a schema file to determine a structure and data formats;
   parsing, by the at least one computer, at least one first structured electronic document of a plurality of linked structured electronic documents to identify at least one reference to a document fragment in a second structured electronic document of the plurality of linked documents;
   generate, by the at least one computer, a third structured electronic document comprising the first structured electronic document with the document fragment inserted in place of the reference;
   validating, by the at least one computer, the third structured electronic document to produce a first diagnostic array based on a mismatch between the third structured electronic document and structure or data formats specified in the schema file; and
   converting, by the at least one computer, the first diagnostic array to a second diagnostic array matching the at least one first structured electronic document.

2. The method of claim 1, wherein the first electronic document comprises source code and the document fragment is a source code fragment.

3. The method of claim 1, wherein inserting the document fragment in the place of the reference comprises:
   parsing one or more override property values in the first structured electronic document; and
   replacing one or more corresponding property values from the document fragment with the override property values in the first structured electronic document.

4. The method of claim 1, wherein the schema file is a JavaScript Object Notation schema and the first and second structured electronic documents are JavaScript Object Notation files comprising source code.

5. The method of claim 1, further comprising:
   determining locations of one or more errors in the third structured electronic document; and
   mapping the locations of the one or more errors in the third structured electronic document to corresponding locations of the errors in one or more of the plurality of linked structured electronic documents.

6. The method of claim 1, further comprising storing a location of an error in the third structured electronic document and a location of the error in the first structured electronic document in an error location mapping table.

7. The method of claim 6, wherein the location of the error in the third structured electronic document and the location of the error in the first structured electronic document form a key/value pair to convert the first diagnostic array to a second diagnostic array, wherein the value specifying the location of the error in the first structured document is stored, during identification of the reference to the document fragment, as the location of the reference, and wherein the key specifying the location of the error in the third structured electronic document is stored, after the first diagnostic array is produced, as the location of the error in the first structured electronic document.

8. The method of claim 1, wherein the first diagnostic array specifies a location of an error in the third structured electronic document and the second diagnostic array specifies a location of the error in the first structured electronic document.

9. A system for validating structured electronic documents comprising:
   at least one processor;
   at least one non-transitory computer readable medium storing computer executable instructions that, when executed by the at least one processor, cause the system to perform actions comprising:
   parsing a schema file to determine a structure and data formats;
   parsing at least one first structured electronic document of a plurality of linked structured electronic documents to identify at least one reference to a document fragment in a second structured electronic document of the plurality of linked documents;
   generate a third structured electronic document comprising the first structured electronic document with the document fragment inserted in place of the reference;
   validating the third structured electronic document to produce a first diagnostic array based on a mismatch between the third structured electronic document and structure or data formats specified in the schema file; and
   converting the first diagnostic array to a second diagnostic array matching the at least one first structured electronic document.

10. The system of claim 9, wherein the first electronic document comprises source code and the document fragment is a source code fragment.

11. The system of claim 9 wherein inserting the document fragment in the place of the reference comprises:
    parsing one or more override property values in the first structured electronic document; and replacing one or more corresponding property values from the document fragment with the override property values in the first structured electronic document.

12. The system of claim 9, wherein the schema file is a JavaScript Object Notation schema and the first and second structured electronic documents are JavaScript Object Notation files comprising source code.

13. The system of claim 9, further comprising:
determining locations of one or more errors in the third structured electronic document; and
mapping the locations of the one or more errors in the third structured electronic document to corresponding locations of the errors in one or more of the plurality of linked structured electronic documents.

14. The system of claim 9, further comprising storing a location of an error in the third structured electronic document and a location of the error in the first structured electronic document in an error location mapping table, wherein the location of the error in the third structured electronic document and the location of the error in the first structured electronic document form a key/value pair, wherein the value specifying the location of the error in the first structured document is stored during identification of the reference to the document fragment as the location of the reference and the key specifying the location of the error in the third structured electronic document is stored after the first diagnostic array is produced as the location of the error in the first structured electronic document.

15. The system of claim 9, wherein the first diagnostic array specifies a location of an error in the third structured electronic document and the second diagnostic array specifies a location of the error in the first structured electronic document.

16. One or more non-transitory computer-readable medium storing computer-executable instructions that, when executed by at least one processor, perform a method of validating structured electronic documents, the method comprising:
parsing a schema file to determine a structure and data formats;
parsing at least one first structured electronic document of a plurality of linked structured electronic documents to identify at least one reference to a document fragment in a second structured electronic document of the plurality of linked documents;
generate a third structured electronic document comprising the first structured electronic document with the document fragment inserted in place of the reference;
validating the third structured electronic document to produce a first diagnostic array based on a mismatch between the third structured electronic document and structure or data formats specified in the schema file; and
converting the first diagnostic array to a second diagnostic array matching the at least one first structured electronic document.

17. The one or more non-transitory computer-readable medium of claim 16, wherein the first electronic document comprises source code and the document fragment is a source code fragment.

18. The one or more non-transitory computer-readable medium of claim 16, wherein inserting the document fragment in the place of the reference comprises:
parsing one or more override property values in the first structured electronic document; and
replacing one or more corresponding property values from the document fragment with the override property values in the first structured electronic document.

19. The one or more non-transitory computer-readable medium of claim 16, wherein the schema file is a JavaScript Object Notation schema and the first and second structured electronic documents are JavaScript Object Notation files comprising source code.

20. The one or more non-transitory computer-readable medium of claim 16, further comprising:
determining locations of one or more errors in the third structured electronic document; and
mapping the locations of the one or more errors in the third structured electronic document to corresponding locations of the errors in one or more of the plurality of linked structured electronic documents.

* * * * *